US012577985B2

(12) United States Patent
Fugel et al.

(10) Patent No.: US 12,577,985 B2
(45) Date of Patent: Mar. 17, 2026

(54) AXIAL ROLLING BEARING UNIT WITH ROLLING BODIES, WHICH ARE ARRANGED BETWEEN ANNULAR AXIAL BEARING WASHERS, IN THE FORM OF A SELF-FIXING ASSEMBLY

(71) Applicant: Schaeffler Technologies AG & Co. KG, Herzogenaurach (DE)

(72) Inventors: Wolfgang Fugel, Nuremberg (DE); Andreas Kirschner, Aurachtal (DE); Frank Schoenstein, Baiersdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 22 days.

(21) Appl. No.: 18/683,268

(22) PCT Filed: Aug. 10, 2022

(86) PCT No.: PCT/DE2022/100582
§ 371 (c)(1),
(2) Date: Feb. 13, 2024

(87) PCT Pub. No.: WO2023/036353
PCT Pub. Date: Mar. 16, 2023

(65) Prior Publication Data
US 2025/0137486 A1      May 1, 2025

(30) Foreign Application Priority Data
Sep. 9, 2021     (DE) ..................... 10 2021 123 373.9

(51) Int. Cl.
*F16C 33/46*          (2006.01)
*F16C 19/30*          (2006.01)

(52) U.S. Cl.
CPC ........ *F16C 33/4605* (2013.01); *F16C 19/305* (2013.01)

(58) Field of Classification Search
CPC ..... F16C 19/30; F16C 19/305; F16C 33/4605
See application file for complete search history.

(56) References Cited

U.S. PATENT DOCUMENTS 4,696,083 A  *  9/1987  Olschewski ............. C21D 9/40
                                                29/DIG. 49
8,166,657 B2 *  5/2012  Oishi ...................... F16C 19/30
                                                29/898.063

(Continued)

FOREIGN PATENT DOCUMENTS

DE         19535085  A1      3/1997
DE         10313183  A1      2/2004

(Continued)

*Primary Examiner* — James Pilkington

(57) ABSTRACT
An axial rolling bearing unit includes a first annular axial bearing washer, a second annular axial bearing washer, a bearing cage, and rolling elements arranged between the first annular axial bearing washer and the second annular axial bearing washer. The bearing cage includes an inner radial edge rim extending in an axial direction to radially guide the rolling elements, and an outer radial edge rim extending in the axial direction to radially guide the rolling elements. The inner radial edge rim or the outer radial edge rim includes an end-side bend extending in an opposite axial direction as a double-rim design, and the end-side bend has a first distal end section that holds the first annular axial bearing washer in a form-fitting manner. The other one of the inner radial edge rim or the outer radial edge rim holds the second annular axial bearing washer in a form-fitting manner.

18 Claims, 1 Drawing Sheet

(56)                    References Cited

U.S. PATENT DOCUMENTS 9,933,010  B2 *    4/2018  Brown .................... F16C 19/55
2024/0369099  A1 *  11/2024  Fugel ................. F16C 33/6681

FOREIGN PATENT DOCUMENTS

| DE | 102018130688 A1 | 6/2020 |
|----|------------------|---------|
| DE | 102018130947 A1 | 6/2020 |
| FR | 1223324 A | 6/1960 |
| FR | 1446492 A | 7/1966 |
| JP | 11006522 A | 1/1999 |
| JP | 11351245 A | 12/1999 |
| JP | 2006022846 A | 1/2006 |
| JP | 2009041753 A | 2/2009 |
| JP | 2012172763 A | 9/2012 |
| JP | 2014005919 A | 1/2014 |
| JP | 2015031390 A | 2/2015 |

* cited by examiner

AXIAL ROLLING BEARING UNIT WITH ROLLING BODIES, WHICH ARE ARRANGED BETWEEN ANNULAR AXIAL BEARING WASHERS, IN THE FORM OF A SELF-FIXING ASSEMBLY

CROSS-REFERENCE TO RELATED APPLICATIONS

This application is the United States National Phase of PCT Appln. No. PCT/DE22/100582 filed Aug. 10, 2022, which claims priority to German Application No. DE102021123373.9 filed Sep. 9, 2021, the entire disclosures of which are incorporated by reference herein.

TECHNICAL FIELD

The present disclosure relates to a rolling bearing unit with rolling elements which are arranged between two annular axial bearing washers and which are guided by means of a bearing cage formed from a sheet metal material.

The field of application of the present invention extends primarily to automotive applications in which, for example, a shaft provided with helically toothed gears is subjected to an axial force which is to be absorbed by a suitable axial bearing relative to a transmission housing or the like.

BACKGROUND

DE 103 13 183 A1 shows an axial rolling bearing unit of the type of interest here. In this disclosure, a collar is arranged on an outer peripheral edge of an axial bearing washer, which is extended by a flange. In a region composed of the collar and flange, a radially inwardly directed nose-like projection is formed, which engages radially behind the cage on the outer circumference. The other axial bearing washer is designed as an angled washer and engages behind the bearing cage on the inner circumference with an axial leg. This angular geometry of the axial bearing washers creates a self-retaining axial rolling bearing unit.

When mounting the bearing cage in the axial bearing washers, which are designed as angled washers, an unfavorable concentricity between the bearing cage and the axial bearing washer can occur, particularly in automated manufacturing. This can result in either bending of the bearing cage or shearing of the retaining lugs on the axial bearing washers. If not detected, this leads to a disturbed running behavior of the axial bearing and can even lead to failure of the entire bearing point. If the overlap between the axial bearing washer, which is designed as an angled washer, and the bearing cage is too small, the axial rolling bearing unit may even be dismantled as a result of vibration stress.

Such axial rolling bearing units usually have a high radial clearance between the bearing cage and the axial bearing washers due to the application, which can lead to a quite significant noise development during operation.

SUMMARY

The present disclosure includes the technical teaching that, in an axial rolling bearing unit with rolling elements which are arranged between two annular axial bearing washers and which are guided by means of a bearing cage formed from a sheet metal material, said bearing cage has an inner and outer radial edge rim extending in the axial direction in order to radially guide the rolling elements. At least one of the edge rims is provided with an end-side bend in the opposite direction, thus having a double-rim design, and the distal end section thereof is designed to hold the first axial bearing washer in a form-fitting manner. An edge rim of the bearing cage lying opposite the double rim is designed to hold the second axial bearing washer in a form-fitting manner, in order to create an overall self-retaining structural unit.

The disclosed device therefore makes use of a small number of components, which are functionally integrated in a specialized manner. The bearing cage not only serves as a carrier for the rolling elements, but also becomes the decisive guiding element of the axial bearing due to the overall design. Depending on the diameter, this leads to a reduction in the radial guide tolerance to around ⅓ and also to a corresponding reduction in noise. Since, contrasting with the prior art discussed at the outset, the disclosed device uses annular and flat axial bearing washers, corresponding material savings are also achieved. In the case of width adjustments to the axial rolling bearing unit due to larger diameter rolling elements, e.g., rollers or needles, only the bearing cage needs to be adapted in terms of construction, as the axial bearing washers are independent of this.

According to an example embodiment of the axial rolling bearing unit, the edge rim designed as a double rim is arranged radially inwards and the other edge rim radially outwards of the bearing cage. This makes it possible to implement a precise movement clearance in the radial direction of up to 0.1 mm in relation to a shaft or the like carrying the axial rolling bearing unit, as a double rim can be formed more precisely and with greater dimensional stability than a simple angling of a leading axial bearing component.

According to a further embodiment, the other edge rim of the bearing cage is also provided with a distal end section for holding the second axial bearing washer in a form-fitting manner. For this purpose, both distal end sections of the edge rims may have a rim border which at least partially surrounds the associated axial bearing washer.

In order to facilitate bending, these edge rims can be wall-ironed by means of forming technology. This means that end sections of thinner material are produced when the bearing cage is deep-drawn. These may interact with axial bearing washers, each of which has an inner and outer radial edge shoulder, so that the rim border bent over to form the enclosure does not project beyond the outer side surface of the axial bearing washers.

Alternatively, it is proposed that the axial bearing washers each have an inner and outer radial edge bevel which interacts with the respectively associated distal end section of the edge rim in such a way that the bent-over rim border comes to bear at least partially against it. Compared to the above embodiment, this requires a bend of less than 90°, e.g., 40° to 50°, or around 45°. This can be achieved using forming technology with less risk of cracking at the bending point. Individual caulkings introduced along the circumference are considered otherwise sufficient.

The two axial bearing washers are designed as identical parts and can therefore be used universally. In addition to a reduction in manufacturing costs, the number of individual parts required is, for example, also reduced. Thus, the axial rolling bearing unit according to the disclosure includes three different types of individual components.

The form-fitting manner in which the axial bearing washers are held in accordance with the disclosure forms the prerequisite for implementing a movement gap of, for example, 0.1 to 0.4 mm, e.g., 0.2 to 0.3 mm, between these and the associated distal end section of the respective edge rim. This high-precision guidance also results in a corresponding reduction in noise during operation without adversely affecting the rolling bearing properties.

In addition, a manufacturing advantage of the axial rolling bearing unit according to the disclosure results from the fact that not only the bearing cage is made of a formed sheet metal material, but, for example, also the annular axial bearing washers, which can be produced by means of forming technology as stamped and embossed parts. In particular, the edge bevel or the edge shoulder of the axial bearing washers can be produced in a simple manner by means of embossing.

BRIEF DESCRIPTION OF THE DRAWINGS

The disclosure is described in more detail below together with the description of exemplary embodiments using the figures. In the figures.

DETAILED DESCRIPTION

Figure 1:
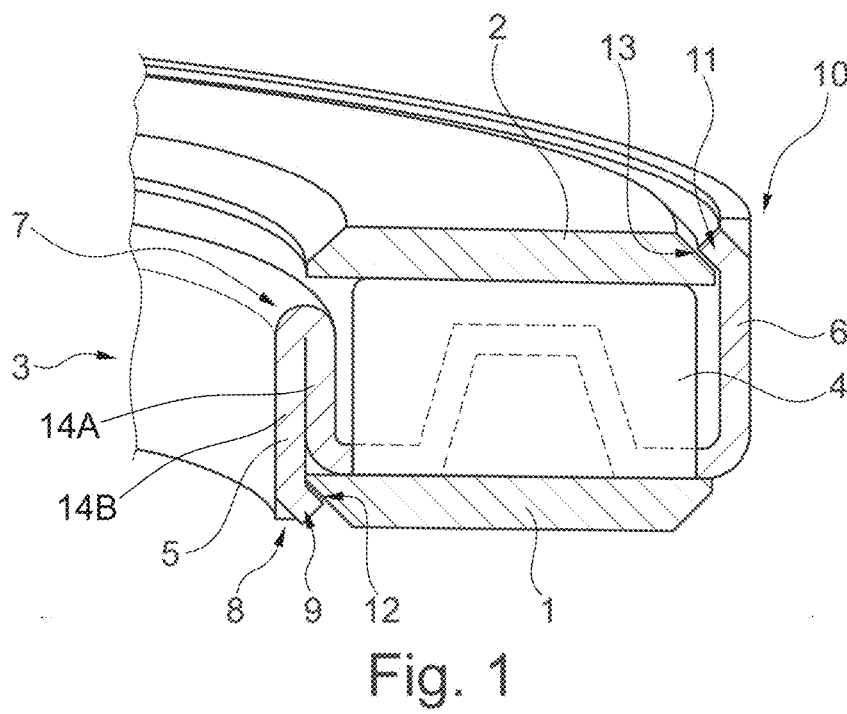
FIG. 1 shows a perspective sectional view of an axial rolling bearing unit according to the disclosure in a first embodiment.

According to FIG. 1, an axial rolling bearing unit includes two identical annular axial bearing washers 1 and 2 (or a first axial bearing washer 1 and a second axial bearing washer 2), between which rolling elements 4, for example, are guided by a bearing cage 3.

The bearing cage 3 is made from a sheet metal material by forming technology and has an inner radial edge rim 5 extending in an axial direction and an outer radial edge rim 6 also extending in the axial direction. The rolling elements 4, which are designed as rollers or needles, are guided radially between the inner radial edge rim 5 and the outer radial edge rim 6.

In this exemplary embodiment, the inner radial edge rim 5 is formed as a double rim and is provided with an end-side bend 7 in the opposite direction in this respect. The end-side bend 7 includes a first planar section 14A and a second planar section 14B that are folded relative to one another to form the double rim. This results in a doubling of the material in terms of sheet thickness. In this regard, a first distal end section 8 of the inner radial edge rim 5 holds the first axial bearing washer 1 in a form-fitting manner. The outer radial edge rim 6 of the bearing cage 3 lies opposite to the double rim and is configured to hold the second axial bearing washer 2 in a form-fitting manner, and a second distal end section 10 thereof is used to surround the second axial bearing washer 2.

Each of the first distal end section 8 and the second distal end section 10 includes a first rim border 9 and a second rim border 11 which at least partially surrounds the associated first axial bearing washer 1 or the second axial bearing washer 2. In this exemplary embodiment, the first rim border 9 and the second rim border 11 are formed as caulkings, of which—not further shown here—several caulkings are arranged and distributed along a respective circumference to enclose the associated first axial bearing washer 1 and the second axial bearing washer 2 in a form-fitting manner.

In this exemplary embodiment, the form-fitting enclosure may be achieved such that the first bent rim border 9 and the second rim border 10 at least partially come to bear against the first axial bearing washer 1 and the second axial bearing washer 2 with an inner radial edge bevel 12 and an outer radial edge bevel 13, respectively, that are introduced radially on an inside and an outside, respectively, of the axial rolling bearing unit. Each of the inner radial edge bevel 12 and the outer radial edge bevel 13 is formed, for example, at an angle of 45° to the longitudinal axis of the bearing. The first rim border 9 and the second rim border 11 may be formed with a small partial bend which may be sufficient for one or more of the disclosed embodiments.

Figure 2:
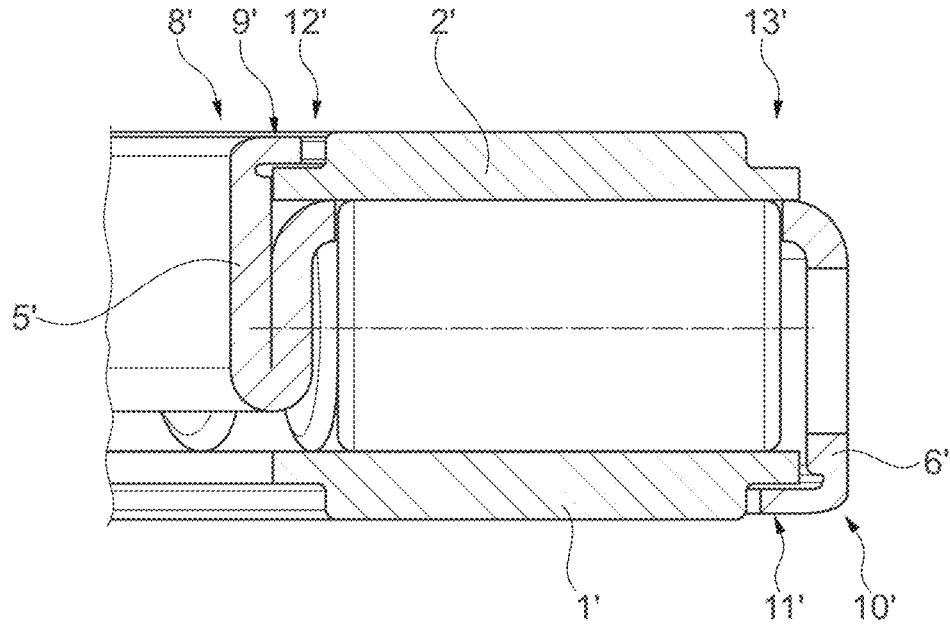
FIG. 2 shows a perspective sectional view of an axial rolling bearing unit according to the disclosure in a second embodiment.

According to FIG. 2, in contrast to this, the axial bearing washers 1' and 2' each have an inner and outer radial edge shoulder 12' and 13', which in principle forms a 90° bend of the edge region. A respectively associated wall-ironed distal end section 8' and 10' of the associated edge rims 5' and 6', which is therefore of thinner material compared to the edge rim thickness, comes to bear against this in such a way that the enclosure does not project beyond the outer side surface of the axial bearing washer 1' and 2'. In this exemplary embodiment, in contrast to the exemplary embodiment described above, the entire rim border 9 and 10 should be bent by 90° in each case.

REFERENCE NUMERALS 1, 1' Axial bearing washer
2, 2' Axial bearing washer
3 Bearing cage
4 Rolling elements
5, 5' First edge rim
6, 6' Second edge rim
7 Bend
8, 8' First distal end section
9, 9' First rim border
10, 10' Second distal end section
11, 11' Second rim border
12, 12' Inner radial edge bevel/shoulder
13, 13' Outer radial edge bevel/shoulder
14A First planar section
14B Second planar section

The invention claimed is:

1. An axial rolling bearing unit comprising:
a plurality of rolling elements which are arranged between a first annular axial bearing washer and a second annular axial bearing washer and which are guided by a bearing cage formed from a sheet metal material, the bearing cage having a first edge rim and a second edge rim extending in an axial direction to radially guide the plurality of rolling elements, wherein the first edge rim includes an end-side bend on one side thereof that includes a first planar section and a second planar section that are folded relative to one another to form a double rim having a folded portion, wherein a distal end section of the first edge rim is positioned opposite to the folded portion to hold the first annular axial bearing washer in a form-fitting manner, and the second edge rim of the bearing cage lies opposite to the double rim to hold the second annular axial bearing washer in a form-fitting manner, and wherein the distal end section includes a first angled rim border configured to engage and retain a first edge bevel of the first annular axial bearing washer and the second edge rim includes a second angled rim border configured to engage and retain a second edge bevel of the second annular axial bearing washer to create a self-retaining structural unit.

2. The axial rolling bearing unit according to claim 1, wherein the first edge rim that is configured as the double rim is arranged radially inwards and the second edge rim is arranged radially outwards of the bearing cage.

3. The axial rolling bearing unit according to claim 1, wherein the second edge rim of the bearing cage further comprises a distal end section that includes the second angled rim border configured for holding the second annular axial bearing washer in the form-fitting manner.

4. The axial rolling bearing unit according to claim 3, wherein the first angled rim border at least partially surrounds the first annular axial bearing washer and the second angled rim border at least partially surrounds the second annular axial bearing washer, respectively.

5. The axial rolling bearing unit according to claim 3, wherein at least one of the distal end section of the first edge rim and the second edge rim, respectively, is wall-ironed by a forming technology to facilitate bending.

6. The axial rolling bearing unit according to claim 1, wherein the first annular axial bearing washer and the second annular axial bearing washer are identical.

7. The axial rolling bearing unit according to claim 1, wherein the first annular axial bearing washer and the distal end section of the first edge rim define a movement gap of 0.1 to 0.4 millimeters.

8. The axial rolling bearing unit according to claim 1, wherein the first annular axial bearing washer and the second annular axial bearing washer are also produced by a forming technology from a sheet metal material as stamped and embossed parts.

9. The axial rolling bearing unit of claim 1, wherein the first angled rim border extends towards the plurality of rolling elements to engage the first edge bevel of the first annular axial bearing washer.

10. The axial rolling bearing unit of claim 9, wherein the second angled rim border extends inwardly towards the plurality of rolling elements to engage the second edge bevel of the second annular axial bearing washer.

11. An axial rolling bearing unit comprising:
a first annular axial bearing washer;
a second annular axial bearing washer;
a bearing cage; and
a plurality of rolling elements arranged between the first annular axial bearing washer and the second annular axial bearing washer; wherein:
the bearing cage comprises:
a first radial edge rim extending in an axial direction to radially guide the rolling elements; and
a second radial edge rim extending in the axial direction to radially guide the plurality of rolling elements;

the first radial edge rim comprises an end-side bend that includes a first planar section and a second planar section that are folded relative to one another to form a double-rim design having a folded portion;
the end-side bend comprises a first distal end section positioned opposite to the folded portion that holds the first annular axial bearing washer in a form-fitting manner; and
the second radial edge rim holds the second annular axial bearing washer in a form-fitting manner; and
the first distal end section includes a first angled rim border configured to engage and retain a first edge bevel of the first annular axial bearing washer and the second radial edge rim includes a second angled rim border configured to engage and retain a second edge bevel of the second annular axial bearing washer to provide a self-retaining structural unit.

12. The axial rolling bearing unit of claim 11, wherein the first radial edge rim is an inner radial edge rim.

13. The axial rolling bearing unit of claim 11, wherein the second radial edge rim further comprises a second distal end section that includes the second angled rim border that holds the second annular axial bearing washer in the form-fitting manner.

14. The axial rolling bearing unit of claim 13, wherein:
the first angled rim border at least partially surrounds the first annular axial bearing washer; and
the second angled rim border at least partially surrounds the second annular axial bearing washer.

15. The axial rolling bearing unit of claim 14, wherein:
the first distal end section is wall-ironed by a forming technology to facilitate bending; or
the second distal end section is wall-ironed by the forming technology to facilitate bending.

16. The axial rolling bearing unit of claim 11, wherein the first annular axial bearing washer and the second annular axial bearing washer are identical parts.

17. The axial rolling bearing unit of claim 11, wherein the first angled rim border extends towards the plurality of rolling elements to engage the first edge bevel of the first annular axial bearing washer.

18. The axial rolling bearing unit of claim 17, wherein the second angled rim border extends inwardly towards the plurality of rolling elements to engage the second edge bevel of the second annular axial bearing washer.

* * * * *